Aug. 10, 1965  J. S. SCOGGIN  3,200,066
RECOVERY OF HYDROCARBON DILUENT FROM A FLASH GAS
Filed Jan. 22, 1962
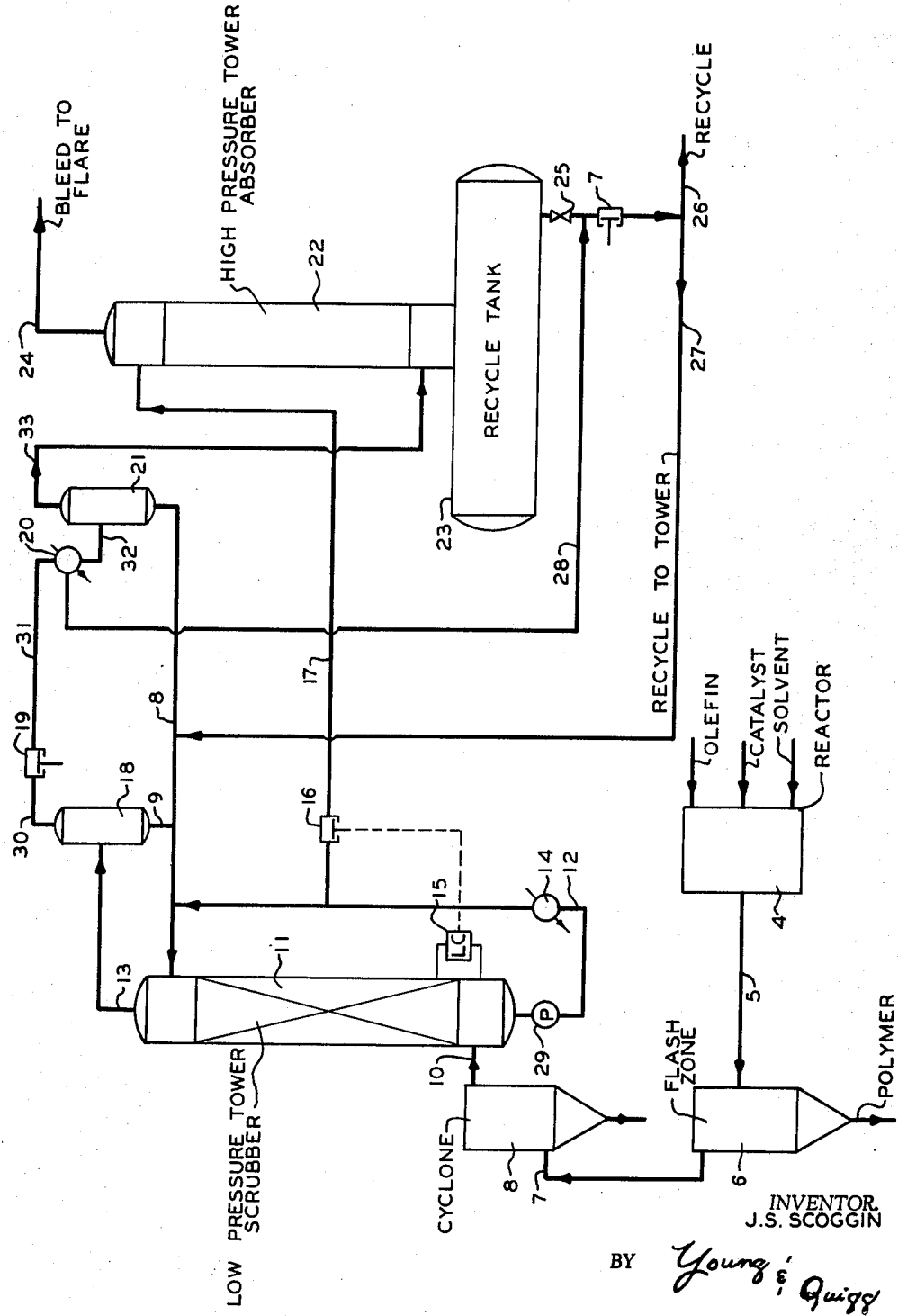
INVENTOR.
J.S. SCOGGIN
BY *Young & Quigg*
ATTORNEYS 3,200,066
RECOVERY OF HYDROCARBON DILUENT
FROM A FLASH GAS
Jack S. Scoggin, Bartlesville, Okla., assignor to Phillips
Petroleum Company, a corporation of Delaware
Filed Jan. 22, 1962, Ser. No. 167,673
4 Claims. (Cl. 208—342)

This invention relates to a method and apparatus for separating and recovering individual fluids from a mixture containing same. More particularly, this invention relates to method and apparatus for separating the components of a gaseous mixture from a polymerization flashing zone and recovering the polymerization diluent therefrom for reuse.

In many polymerization processes for the production of normally solid polymer a stream is formed which is a slurry of particulate polymer solids suspended in a liquid medium, ordinarily the reaction diluent. In copending application of G. T. Leatherman and C. V. Detter, Serial No. 590,567, filed June 11, 1956, now abandoned, a process is disclosed for the polymerization of ethylene in a hydrocarbon diluent to form a slurry of non-agglomerating solids in the diluent. In this process or in other processes in which the polymer is prepared in solution and subsequently precipitated to form a slurry there exists a problem in separating the entrained solid fines from the diluent after the majority of the polymer has been removed by flashing and then recovering the hydrocarbon diluent for reuse in the system. A convenient method of separating the majority of the solid polymer is by flashing the hydrocarbon into vapor by reducing the pressure on the slurry. However, polymer fines are carried over with the vapor and require additional separation. In addition, when the volatilized diluent is recovered undesirable contaminants must be removed in order to render same suitable for reuse in the polymerization system.

According to my invention, a method and apparatus are provided which allow for an increase in the polymerization throughputs at lower solvent losses over that heretofore obtained. In addition, there is provided a method and apparatus for obtaining throughput increase while adding only a minimum amount of additional equipment to the system. Thus, a first zone is provided which is so adapted as to remove as liquid only a portion of the vapors introduced to same. A second zone is provided to remove additional amounts of the materials removed in the first zone and so adapted that the requisite refrigeration for same is provided from the recycle stream of the first zone. By allowing the first zone to remove only a portion of the introduced vapor as liquid and then providing a second zone for additional removal of components of the overhead vapor, the overall throughput of the system is increased substantially without having to increase the original refrigeration capacity of the system.

According to my invention a method and apparatus are provided for separating liquid hydrocarbon in a polymerization system from a vapor mixture containing same which comprises flashing the polymer slurry and obtaining a vapor mixture overhead which contains the hydrocarbon diluent, passing the vapor to a wash zone which is operated at a low pressure and removing therein a major portion of the hydrocarbon diluent by contacting the vapor with a chilled stream of same, passing the uncondensed portion overhead, removing any entrained liquid from same, compressing the vapors to a higher pressure and introducing the compressed overhead vapors to an absorption zone wherein substantially all the hydrocarbon diluent thereof is removed by contacting the higher pressure vapors with a compressed portion of the chilled stream obtained in the wash zone. The hydrocarbon thus recovered is in a substantially pure form and can be recycled to the reactor system. Overhead vapors containing light inert materials can be removed by bleeding off and flaring from the absorption zone.

Thus it is an object of my invention to provide a method and apparatus for the recovery of vaporized hydrocarbon diluent in a polymerization system. Another object of the invention is to provide an improved method and apparatus for recovery of vaporized hydrocarbon diluent in such a manner as to allow a substantial increase in the throughput of the system. A still further object is to provide method and apparatus for increasing the throughput of a polymerization process by providing a method and means to recover vapors without having to add additional refrigeration means to the system.

Other aspects, objects, and the several advantages of this invention will be apparent from a study of the disclosure, appended claims and the drawing which is a schematic diagram of the hydrocarbon recovery system.

The method and apparatus of my invention can be used in any process requiring a separation of solids from a mixture of these solids in a liquid diluent. The invention is also applicable to any system wherein a particular vapor component is desired from a mixture containing same. Many olefin polymerization processes produce such a slurry where a separation of this type is required. Of particular importance in this field are polymerization processes such as those described in the patent to Hogan et al., U.S. 2,825,721, issued March 4, 1958. My invention is especially useful in a process such as those described in the above-mentioned copending application of Leatherman and Detter since in such a process the reactor effluent is a suspension of solid particulate polymer in a liquid hydrocarbon diluent. In this process ethylene or mixtures of ethylene with other unsaturated hydrocarbons are contacted with a suspension of chromium oxide-containing catalyst in a liquid hydrocarbon diluent, the contacting occurring at a temperature such that substantially all of the polymer produced is insoluble in the diluent and in solid particle form, the particles being substantially non-tacky and non-agglutinative and suspended in the liquid diluent. The olefins employed are 1-olefins having up to 8 carbon atoms per molecule and no branching nearer the double bond than the 4-position. Examples of these materials include ethylene, propylene, butene-1, 1-pentene, 1-octene and 1,3-butadiene. The liquid hydrocarbon diluents which are suitable include paraffins having 3 to 12, preferably 3 to 8, carbon atoms per molecule, such as propane, n-butane, n-pentane, isopentane, n-hexane, isooctane and the like. Some naphthenes can be present in the diluent and mixtures of paraffins and isoparaffins can be employed. Naphthenic hydrocarbons having from 5 to 6 carbon atoms in a naphthenic ring which can be maintained in a liquid phase under the polymerization conditions can be employed such as cyclohexane, cyclopentane, methylcyclopentane, ethylcyclohexane, and the like. The temperature of the polymerization depends upon the hydrocarbon diluent chosen and is generally in the range of about 230° F. and below. The pressure of the reaction is sufficient to maintain the diluent in a liquid phase and is normally about 100 to 700 p.s.i.a. A slurry containing as high as 55 weight percent particulate polymer in the hydrocarbon diluent can be obtained by this process and the vapors obtained in the subsequent recovery of the polymer treated according to this invention.

In accordance with this invention as shown in the accompanying figure, olefins, catalyst and solvent are introduced to a reactor 4. After polymreization is complete the effluent therefrom is introduced by means of conduit 5 to flash zone 6 wherein a major portion of the diluent is removed and most of the polymer is collected. A feed of flash gas at about 150° F. and 19 p.s.i.a. from the polymer flash vessel 6 is introduced through conduit 7 into cyclone separator 8 and then into wash tower 11 by way of conduit 10 where it is scrubbed of any additional solids and cooled to about 75° F. at 18 p.s.i.a. by liquid stream 12 which enters scrubbing tower 11 at about 45° F. and due to heat exchange with the feed stream leaves at about 75° F. About 44 weight percent of the flash gas introduced through conduit 10 is condensed in the column. Liquid stream 12 is refrigerated by cooler 14 which is operated at a temperature of about 5° F. Off-gas from column 11 is passed by means of conduit 13 to knock-out chamber 18 where any liquid is removed by means of conduit 9. The gas from the knock-out drum which is set at about 75° F. at 18 p.s.i.g. is then introduced by conduit 30 to compressor 19 and compressed to to about 80 p.s.i.a. and then cooled by exchanger 20. Any condensed liquid, generally about 80 weight percent of the stream from knock-out chamber 18, is removed by knock-out chamber 21, by way of conduit 8 and returned to the recycle stream. Off-gas from knock-out chamber 21 at about 80 p.s.i.a. and 105° F. is passed by means of conduit 33 to column 22. A portion of condensed liquid from column 11 is removed by conduit 17 and compressed to about 80 p.s.i.a. by pump 16 so that it is introduced into column 22 at about the same pressure as the feed stream 33 to the column. This condensed liquid serves to recover about 60 weight percent of the feed stream from knock-out chamber 21. Unrecovered gas is passed from the column by means of conduit 24 as overhead waste gas and is subsequently flared. The recovered liquid from column 22 is collected in recycle tank 23. Pump 27 removes this liquid by means of conduit 25 and passes a portion of same as recycle to the reactors via line 26 and a second portion back as recycle via line 27. Liquid level control means 15 is provided on column 11 and serves to adjust pump 16 so as to maintain a desired liquid level of condensate in the column.

As in alternative method for carrying out this invention, the cooler 20 and knock-out drum 21 are omitted and compressor 19 off-gas fed directly into column 22. While satisfactory results are obtained, the use of the additional cooler and knock-out drum enhances the overall operation of the system.

*Example*

Ethylene, butene-1 and normal pentane are continuously fed to a reactor which is maintained at a temperature of 190° F. at a pressure of 465 p.s.i.a. Chromium oxide catalyst containing 2.5 weight percent chromium oxide on a 90/10 silica alumina support is fed to the reactor. A slurry containing about 20 weight percent solids is formed in the reactor and concentrated to about 45 weight percent particulate ethylene-butene copolymer in normal pentane which is then passed in pulsating flow to a flash chamber operated at 3 p.s.i.g. and and 150° F. Polymer solids containing about 12 weight percent residual pentane are passed to a conveyor dryer. Carbon dioxide is introduced to the dryer at a rate of 27 lbs./hr. and at a temperature of 150° F. This stripping gas with the residual pentane is passed to a flare. Polymer solids are conveyed in an air stream to storage.

Vaporized hydrocarbons are passed from the flash chamber through a gas cyclone. Entrained polymer solids are kept from building up on the wall of the flash chamber by scraper chains. Water at a temperature of 200° F. is circulated through the coils around the flash chamber. The hydrocarbon vapor from the cyclone substantially free of entrained polymer fines is passed to a wash tower.

The essentially polymer free vapors from flash gas cyclone containing a mixture of ethylene, butene, and n-pentane are introduced into the packed wash tower at a temperature of about 130° F. These vapors are then partially condensed by the action of a refrigerated recycle pentane stream which is chilled to about 40° F. and circulated back to the column. By operating at this temperature the flow rate of vapors from the cyclone can be substantially increased. This condensing or washing operation serves to remove a substantial portion of pentane content of the vapors and substantially all of the entrained polymer solids. Wash tower off-gas containing ethylene, butene-1 and n-pentane are removed overhead to a knock-out chamber where additional liquid pentane entrained in same is removed and returned to the wash tower recycle stream. The off-gas from the knock-out drum is then compressed to about 75 p.s.i.a. and then cooled to about 105° F. at 75 p.s.i.a. and the liquid portion of same which comprises essentially pentane is withdrawn and returned to the recycle stream of the washtower or recycled to the reactor by way of line 26. The uncondensed gases from the cooler which comprise essentially ethylene and pentane are then passed to an ethylene absorber at about 150° F. at 75 p.s.i.a. A portion of the recycle liquid pentane stream of the wash tower is withdrawn and compressed to about 75–80 p.s.i.a. and introduced into an upper zone of the ethylene absorber. This serves to further condense the pentane content of the vapor stream from the condenser and this condensate is recovered in a recycle tank for subsequent use in both the initial washing operation and as a recycle to the reactor. Uncondensed vapors are removed from the column and flared.

In carrying out this invention the wash column is operated within the range of about 1 to 5 p.s.i.g. (15–20 p.s.i.a.) and at a temperature of about 40–150° F. The absorption column is a high pressure column operated in the range of 60 to 100 p.s.i.a. and at a temperature of about 35 to 70° F.

Reasonable variation and modification are possible within the scope of the foregoing disclosure, drawings and the appended claims to the invention, the essence of which is that there has been provided a method and apparatus for recovering hydocarbon components from a mixture thereof which comprises flashing said mixture in a flash zone, passing the vapor from said flashing zone to a washing zone, condensing a portion of said vapor in said washing zone and removing same from a lower end of said washing zone, returning the condensed vapor as recycle to said washing zone, removing vapor from said washing zone, removing any entrained liquid from said vapor, compressing and cooling said liquid-free vapor, passing said cooled liquid free vapor to an absorption zone, removing a portion of the liquid recycle of said wash zone, compressing and passing same as absorbent to said absorption zone, absorbing the cooled liquid-free vapor, recovering, as a liquid, a portion of said vapor, and returning a portion of the recovered liquid as a recycle to said wash zone.

I claim:

1. A method for recovering hydrocarbon diluent from a polymerization effluent containing same which comprises flashing said polymerization effluent in a flash zone, passing vapors therefrom to a low pressure wash zone maintained at about 18 p.s.i.a. at 50° F., condensing a portion of said vapors in said low pressure wash zone, removing said condensed vapors from a first end of said zone, chilling said removed condensed vapors to about 15° F., returning a portion of the chilled condensed vapors to a second end of said zone, passing the uncondensed vapors to a knock-out zone so as to remove liquid entrained therein, compressing the liquid-free vapors to about 80 p.s.i.a., cooling the compressed vapors, removing any additional liquid from the cooled, compressed vapors, passing same as feed to a high pressure absorption zone maintained at about 75 p.s.i.a., removing a portion of the chilled condensed vapors from said low pressure wash zone, compressing the chilled removed portion to about the pressure being maintained in said high pressure absorption zone, introducing the compressed, chilled liquid as absorbent in said high pressure zone, condensing a portion of the feed to said high pressure zone, recovering condensed liquid from said high pressure zone, removing and flaring uncondensed vapors from said high pressure zone and subsequently returning the recovered liquid to the polymerization system.

2. A method of recovering hydrocarbon components from a mixture thereof which comprises flashing said mixture in a flash zone, passing the vapor from said flash zone to a low pressure wash zone, condensing a portion of said vapor in said low pressure wash zone and removing same from a lower end thereof, returning a portion of the condensed vapor as recycle to said low pressure wash zone, removing vapor overhead from said low pressure wash zone, removing entrained liquid from said vapor, compressing and cooling the resulting liquid-free vapor, passing said cooled liquid-free vapor to a high pressure absorption zone, removing a portion of the liquid recycle of said low pressure wash zone, pressuring and passing said portion as absorbent to said high pressure absorption zone, absorbing the cooled liquid-free vapor, recovering as a liquid a portion of said liquid-free vapor, and returning a portion of the recovered liquid as recycle to said low pressure wash zone.

3. A method of recovering hydrocarbon diluent from a polymerization effluent containing same which comprises flashing the polymerization effluent in a flashing zone, passing the resultant vapor to a low pressure wash zone, condensing said hydrocarbon diluent from said vapor in said low pressure wash zone, removing the condensed dilent and returning a portion of same as recycle to said low pressure wash zone, removing a portion of said diluent recycle and passing same as recycle to a high pressure absorption zone, removing uncondensed vapors from said low pressure wash zone, compressing said uncondensed vapors and introducing same to a high pressure absorption zone, condensing the hydrocarbon diluent in the compressed vapors and removing same from said high pressure absorption zone, and removing and flaring the remaining uncondensed vapors from said high pressure absorption zone.

4. The method of claim 2 wherein said low pressure zone is operated with a pressure range of about 1–5 p.s.i.g. and a temperature of about 40–150° F. and said high pressure zone is operated within the range of about 60–100 p.s.i.a. and a temperature of about 35 to 70° F.

References Cited by the Examiner

UNITED STATES PATENTS

| | | | |
|---|---|---|---|
| 2,272,306 | 2/42 | Mather | 208—342 |
| 2,293,241 | 8/42 | Campbell | 208—342 |
| 2,409,691 | 10/46 | Noble | 208—345 |
| 2,504,429 | 4/50 | Latchum | 208—345 |
| 2,939,834 | 6/60 | Evans | 208—342 |

OTHER REFERENCES

"The Oil and Gas Journal," vol. 49, issue 50, 208–342, pages 148 to 150, 220 to 222, Apr. 19, 1951.

ALPHONSO D. SULLIVAN, *Primary Examiner.*